(12) United States Patent
Chauhan

(10) Patent No.: US 12,204,632 B1
(45) Date of Patent: Jan. 21, 2025

(54) USER AUTHENTICATION WITHIN A VIRTUALIZED APPLICATION

(71) Applicant: T-Mobile USA, Inc., Bellevue, WA (US)

(72) Inventor: Kanakrai Chauhan, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 58 days.

(21) Appl. No.: 17/180,612

(22) Filed: Feb. 19, 2021

(51) Int. Cl.
*G06F 21/00* (2013.01)
*G06F 21/32* (2013.01)
*G06F 21/44* (2013.01)
*G06F 21/45* (2013.01)
*H04W 12/30* (2021.01)

(52) U.S. Cl.
CPC .............. *G06F 21/44* (2013.01); *G06F 21/32* (2013.01); *G06F 21/45* (2013.01); *H04W 12/30* (2021.01); *G06F 2221/2141* (2013.01)

(58) Field of Classification Search
CPC .......... G06F 21/32; G06F 21/44; G06F 21/45; H04W 12/30
See application file for complete search history.

(56) References Cited

U.S. PATENT DOCUMENTS

| | | | | |
|---|---|---|---|---|
| 9,374,369 | B2 * | 6/2016 | Mahaffey | G06F 21/6245 |
| 10,057,227 | B1 * | 8/2018 | Hess | G06F 21/31 |
| 10,083,052 | B1 * | 9/2018 | Venkatraman | G06F 8/61 |
| 2016/0127902 | A1 * | 5/2016 | Ciarniello | G06F 21/43 |
| | | | | 380/247 |
| 2017/0324737 | A1 * | 11/2017 | Evans | H04L 63/06 |
| 2020/0275275 | A1 * | 8/2020 | Zhu | H04W 12/102 |
| 2021/0056552 | A1 * | 2/2021 | Murray | G06Q 20/3274 |
| 2021/0185531 | A1 * | 6/2021 | Avetisov | H04L 9/321 |

* cited by examiner

*Primary Examiner* — Rodman Alexander Mahmoudi
(74) *Attorney, Agent, or Firm* — Foley IP Law, PLLC

(57) ABSTRACT

Solutions for user authentication within a virtualized application include: receiving an indication of a login attempt by a user equipment (UE) using the virtualized application; based on at least receiving the indication of the login attempt by the UE, transmitting a short message service (SMS) message to the UE, the SMS message indicating an authentication code; receiving an indication of the UE having received the authentication code; based on at least determining that the indication of the UE having received the authentication code is valid, accepting user credentials from the virtualized application; and based on at least determining that the user credentials are valid, granting the virtualized application access to a controlled resource. In some examples, the controlled resource comprises a secured user account or a payment portal.

20 Claims, 6 Drawing Sheets

USER AUTHENTICATION WITHIN A VIRTUALIZED APPLICATION

BACKGROUND

Virtualized applications (apps), such as instant play apps and App Clips™ permit users to access functionality of smartphone apps, but without requiring the user to actually install an application in the user equipment (UE, e.g., smartphone). Implementations may involve executing the virtualized application on cloud resource hardware and displaying screens from that execution on the UE. Although this may be beneficial for users, there are drawbacks: the virtualized applications may have severe size limitations, limiting functionality, and data resulting from the user's interaction with the virtualized application is generally not persisted. For providers of virtualized applications, this lack of persisted data may introduce challenges.

SUMMARY

The following summary is provided to illustrate examples disclosed herein, but is not meant to limit all examples to any particular configuration or sequence of operations.

Solutions for user authentication within a virtualized application include: receiving an indication of a login attempt by a user equipment (UE) using the virtualized application; based on at least receiving the indication of the login attempt by the UE, transmitting a short message service (SMS) message to the UE, the SMS message indicating an authentication code; receiving an indication of the UE having received the authentication code; based on at least determining that the indication of the UE having received the authentication code is valid, accepting user credentials from the virtualized application; and based on at least determining that the user credentials are valid, granting the virtualized application access to a controlled resource. In some examples, the controlled resource comprises a secured user account or a payment portal.

BRIEF DESCRIPTION OF THE DRAWINGS

The disclosed examples are described below with reference to the accompanying drawing figures listed below, wherein.

Figure 1:
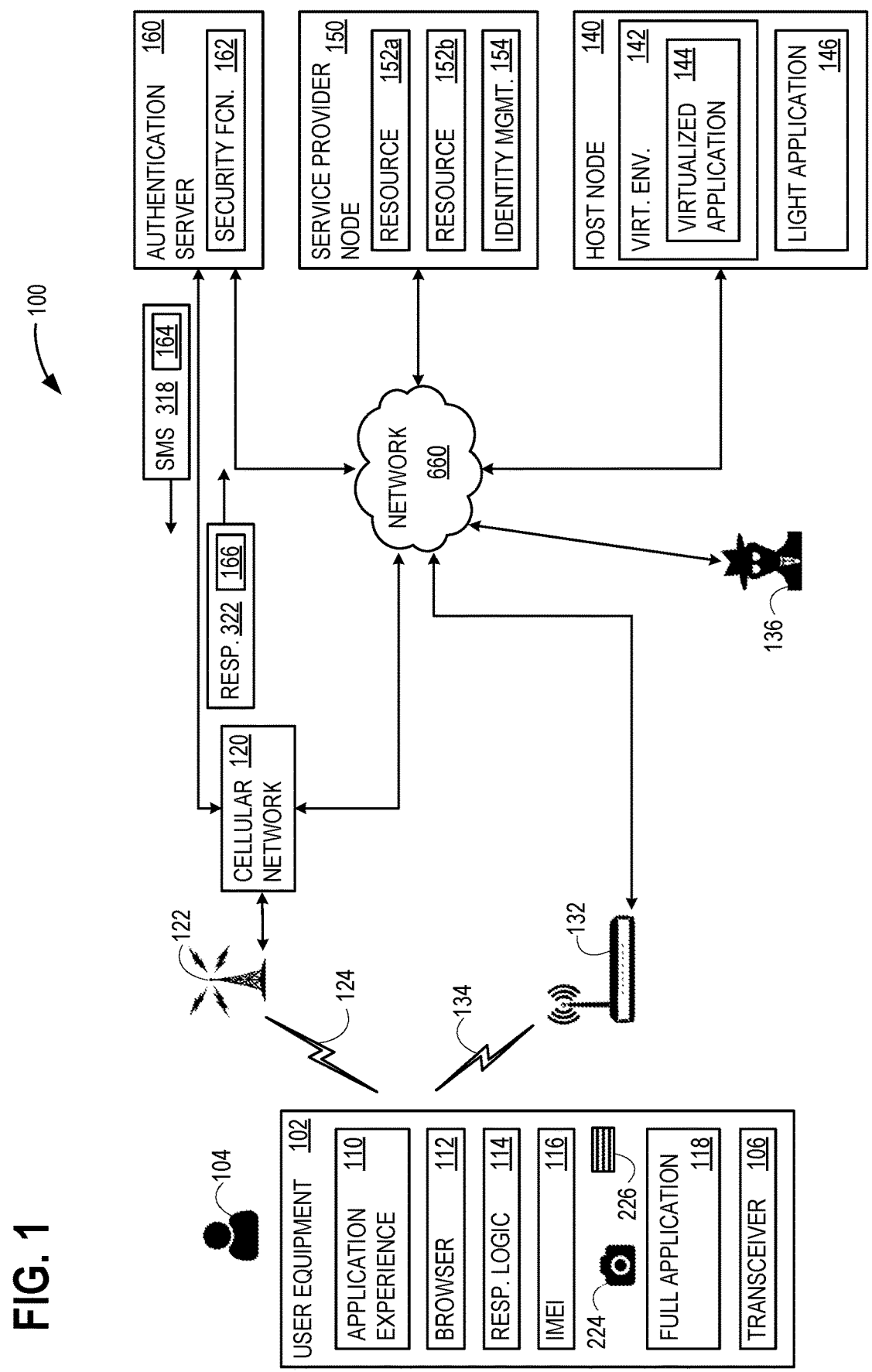
FIG. 1 illustrates an exemplary arrangement that advantageously enables user authentication within a virtualized application.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Some internet resources, such as user accounts (with user profiles) that a user may have with a service provider (e.g., a cellular carrier, other utility, banks, e-commerce websites, etc.) and payment portals may be targeted by hackers. In some scenarios, a hacker may attempt to access a user credential entry page in order to try multiple guesses at user credentials, hoping to break into a user account and access user information, products, or services. Service providers thus have an incentive to minimize exposure of user credential entry pages-even while providing user credential entry pages to legitimate account holders.

One defense that a service provider may use to mitigate hacker attempts is to encourage legitimate account holders to use applications installed on their devices (e.g., UEs), and persist some data on the UE (associated with the installed application, for example a "cookie"). When an account holder attempts to access the internet resource, the service provider's servers, which host the internet resource, use the persisted data on the UE to distinguish between access attempts by legitimate account holders and possible hacker attempts. Upon recognizing the persisted data on a UE, and linking it to an established user account or device, the service provider's servers may then permit the UE to access the user credential entry page. However, without the persisted data, for example with virtualized applications, this mode of distinguishing between access attempts by legitimate account holders and hackers may not be available.

Solutions for user authentication within a virtualized application include: receiving an indication of a login attempt by a user equipment (UE) using the virtualized application; based on at least receiving the indication of the login attempt by the UE, transmitting a short message service (SMS) message to the UE, the SMS message indicating an authentication code; receiving an indication of the UE having received the authentication code; based on at least determining that the indication of the UE having received the authentication code is valid, accepting user credentials from the virtualized application; and based on at least determining that the user credentials are valid, granting the virtualized application access to a controlled resource. In some examples, the controlled resource comprises a secured user account or a payment portal.

Aspects of the disclosure improve security of internet activity by granting virtualized applications access to controlled resources, even while reducing the exposure of user credential entry screens to hacker attacks. Aspects of the disclosure permit service providers to seamlessly authenticate virtualized applications into authentication frameworks, so that users are not required to install fully-functioning applications. For example, a service provider may alert a user to pay a bill using an application furnished by the service provider (which then facilitates access to a controlled resource such as a payment portal). The user may now enjoy the option to use a virtualized app to accomplish this task, while preserving the service provider's security measures.

Aspects of the disclosure operate in an unconventional manner, for example by incorporating a SMS (e.g., a silent SMS) to authenticate a UE, and based on the UE authentication being valid, permits authentication of the user of the UE. Some examples permit use of biometric authentication over a virtualized application.

Authentication is a two-part sequence: (1) verifying that the UE is actually on a specific cellular network using a device token sequence (implemented as silent SMS carrying an authentication code, in some examples), and verifying the correct mobile country code (MCC) and mobile network code (MNC) for the UE, and (2) authenticating user credentials (e.g., user name and password and/or biometric information).

With reference now to the figures, FIG. 1 illustrates an exemplary arrangement 100 that advantageously enables user authentication within a virtualized application 144, in order to access a controlled resource 152a or 152b (e.g., a resource that is access-controlled and requires user credentials) from UE 102. In some examples, controlled resource 152a comprises a secured user account through which a user 104 is able to view account activity (e.g., past transactions, offers, etc.), and controlled resource 152b comprises a payment portal, through which user 104 may make secure payments related to the secured user account. In arrangement 100, user 104 uses UE 102 to control execution of virtualized application 144 that actually executes on a host node 140, rather than on UE 102 itself. This precludes an immediate need to install a full application 118 on UE 102, in order to access controlled resource 152a or 152b, although user 104 may already have full application 118 on UE 102, or may prefer to install full application 118 on UE 102 at a later time, after testing virtualized application 144.

Figure 2:
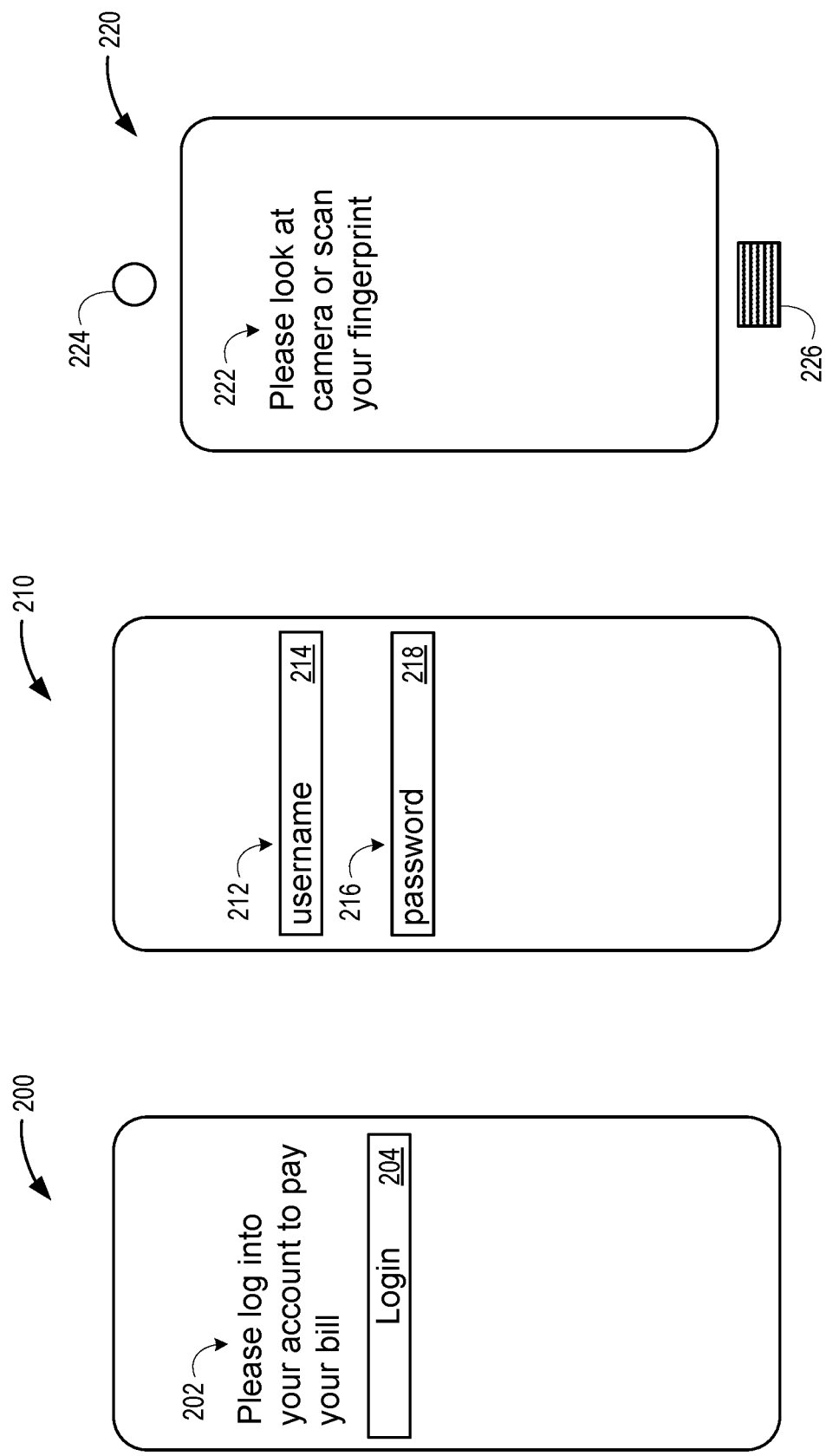
FIG. 2 illustrates exemplary screens that may be displayed to a user in examples of the arrangement of FIG. 1.

Host node 140 has a virtualization environment 142 that intakes a light application 146, which is a software package version of full application 118 that may have been modified (relative to full application 118) in order to meet file size and execution limitations. For example, whereas full application 118 may exceed 15 megabytes (MB) and use background networking, light application 146 may be reduced to smaller 10 MB and have background networking functionality removed. When virtualization environment 142 begins a virtualization session for user 104, virtualization environment 142 intakes light application 146 and creates an instance of light application 146 as virtualized application 144 for execution within virtualization environment 142. Screens produced by virtualized application 144 are displayed on UE 102, as an application experience 110. Some example screens are shown in FIG. 2. In some examples, application experience 110 is displayed directly in a user interface (UI) on UE 102.

Turning briefly to FIG. 2, three example screens from virtualized application 144 are shown, that may be displayed to user 104 as application experience 110: an initial login prompt screen 200, a user credential entry screen 210, and a user credential entry screen 220. When user 104 first attempts to access controlled resource 152a (or 152b, e.g., in order to respond to a notice to pay a bill, or check whether user 104 qualifies for some promotion), user may select (click) a link associated with controlled resource 152a. Because controlled resource 152a requires access credentials, initial login prompt screen 200 is displayed by application experience 110. Initial login prompt screen 200 has a login prompt message 202, informing user 104 that a properly credentialed login is required, and a selectable (clickable) login control button 204 is provided.

User credential entry screen 210 is used for user 104 to enter a username 212 into a username edit box 214 and a password 216 into password edit box 218. User credential entry screen 220 provides a biometric data alternative for user credentials, such as facial recognition, using a camera 224 or a fingerprint reader 226 (on UE 102, as shown in FIG. 1). User credential entry screen 220 has a prompt message 222 to inform user 104 to provide the biometric data that is used for obtaining access to controlled resource 152a or 152b.

Returning to FIG. 1 (but with continued reference to FIG. 2), communication between UE 102 and each of host node 140, a service provider node 150, and authentication server 160 is described. UE 102 uses a transceiver 106 to communicate over a network 660 with at least host node 140 and service provider node 150. Network 660 may be, for example, the internet, and is described further in relation to FIG. 6. UE reaches network 660 through a cellular network 120, via an air interface 124 to a base station 122, or through a router 132 (e.g., a Wi-Fi router), via an air interface 134. It should be understood that other networking routes may be used. It should also be understood that authentication server 160 or service provider node 150 communicate as necessary to facilitate user authentication processes.

In one illustrative example, a hacker 136 is attempting to compromise user accounts by guessing user credentials, and may try login attempts at service provider node 150 using a high number of possible user credential variations. In some examples, hacker 136 represents a human, although in some other examples, hacker 136 represents automated attack software (e.g., a "bot"). For defense against hacker 136, service provider node 150 screens login attempts by accepting login credential entry from only recognized devices. In some examples, full application 118 facilitates this security measure by storing persistent data (e.g., a cookie or some other data) on UE 102, so that when user 104 attempts to access controlled resource 152a or 152b, service provider node 150 recognizes UE 102. Upon initial registration of UE 102 with service provider node 150, additional steps may be needed. However, for subsequent access attempts, service provider node 150 already recognizes UE 102 (due to the persistent data) and login by user 104 becomes simpler. This permits user 104 to access controlled resources 152a and 152b with relative convenience, while mitigating attempts by hacker 136.

Figure 3:
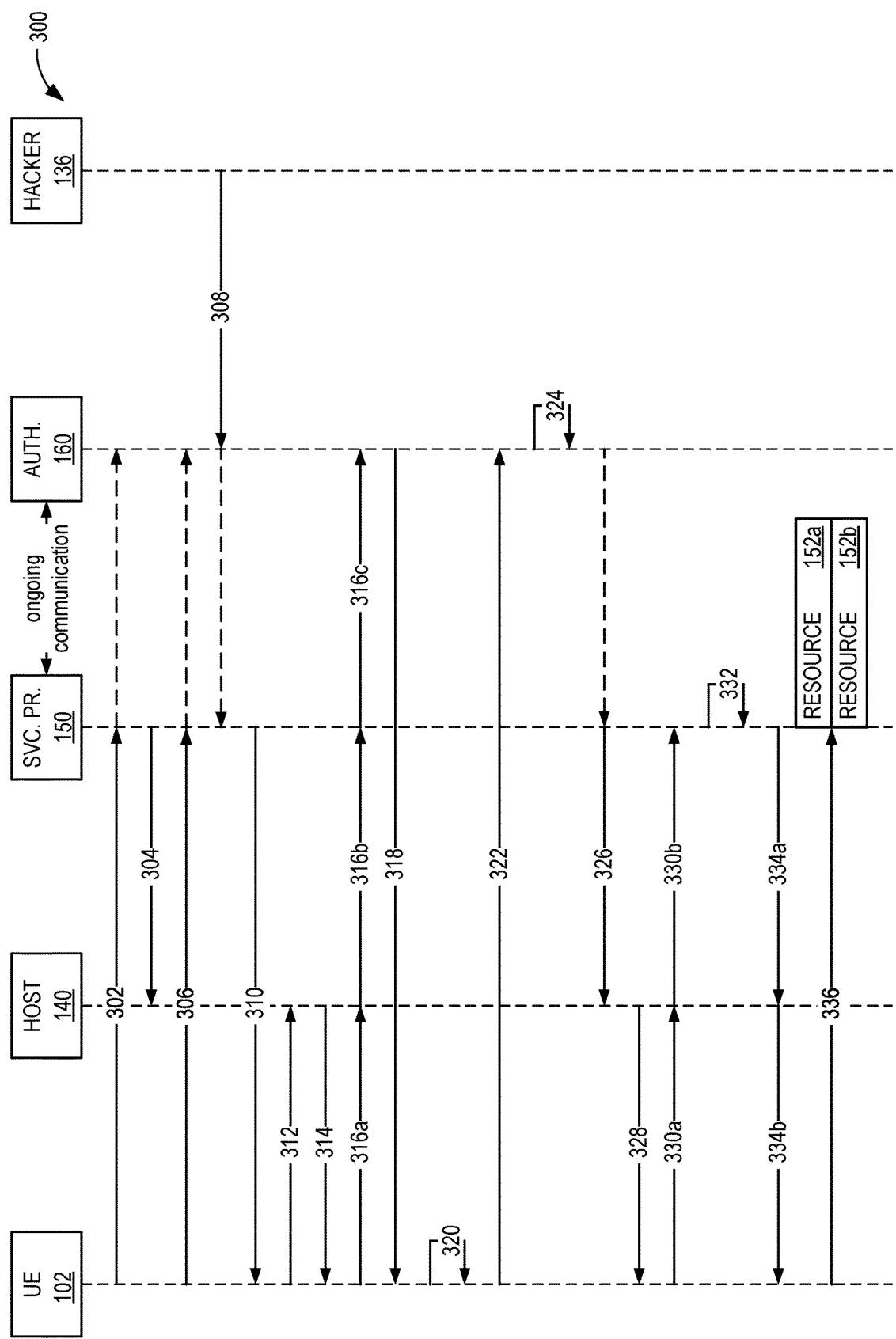
FIG. 3 illustrates an exemplary message sequence diagram of messages that may be used in examples of the arrangement of FIG. 1.
Figure 4:
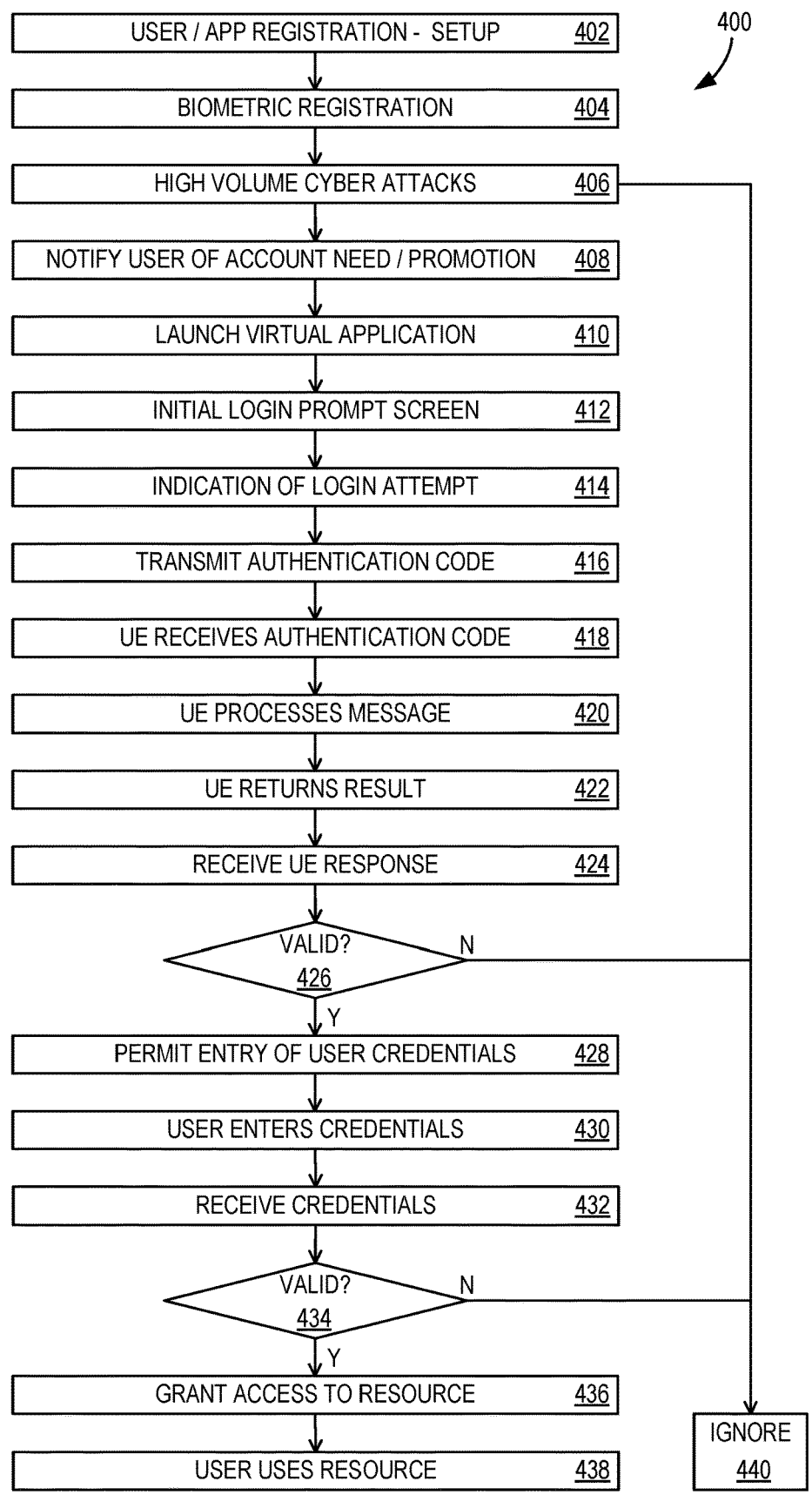
FIG. 4 illustrates a flowchart of exemplary operations that may be associated with examples of the arrangement of FIG. 1.

However, in some scenarios, user 104 has not yet installed full application 118 on UE 102, and virtualized application 144 may be curtailed in functionality such that it is unable to store persistent data on UE 102. Therefore, measures that enable user authentication within virtualized application 144 are described with additional reference to FIGS. 3 and 4. FIG. 3 is a message sequence diagram 300 that shows a series of messages used in some examples of arrangement 100, and is described in conjunction with FIG. 4. FIG. 4 illustrates a flowchart 400 of exemplary operations associated with user authentication within a virtualized application. The messages of messaging sequence diagram 300 occur during various operations of flowchart 400. In some examples, at least a portion of messaging sequence diagram 300 and at least a portion of flowchart 400 may each be performed using one or more computing devices 600 of FIG. 6. FIGS. 1, 3, and 4 should be viewed together.

Operation 402 (FIG. 4) provides setup for user authentication within virtualized application 144. User 104 sets up a secured user account at service provider node 150 (message at 302 of FIG. 3), and the service provider (that operates service provider node 150) makes light application 146 available for execution by host node 140 (message 304). Light application 146 has connectivity logic to service provider node 150 so that, when light application 146 executes as virtualized application 144 within virtualization environment 142, selected inputs by user 104 on UE 102, specifically user 104 interacting with application experience 110, are provided to service provider node 150 (and/or authentication server 160). In some examples, user 104 sets up a secured user account at authentication server 160. In some examples, authentication server 160 is a separate node, with a different internet protocol (IP) address, than service provider node 150. In some examples, however, authentication server 160 is not a separate node than service provider node 150, and the functionality described for authentication server 160 is performed at or by service provider node 150.

Operation 404 continues the setup process in examples in which user 104 wishes to use biometric data as user credentials. Operation 404 includes service provider node 150 (or authentication server 160) receiving a biometric registration from UE 102 for use of biometric data for the user credentials, wherein receiving the biometric data comprises an image of the face of user 104 or the fingerprint of user 104. Camera 224 may be used to capture a facial image, and fingerprint reader 226 may be used to read a fingerprint. The biometric registration information is sent as message 306.

At 406, hacker 136 attempts to guess user credentials at service provider node 150 or authentication server 160, using message 308. Service provider node 150 (or authentication server 160) recognizes this attempt as not coming from a registered device, and so this attempt is ignored at 440. In some scenarios, bot and hacker attempts to guess user credentials may exceed legitimate login attempts.

The service provider notifies user 104 that a bill is due for payment or that user 104 has qualified for some promotion in operation 408, using message 310. In some examples, message 310 may be a text message (e.g., an SMS message) or an email. User 104 launches virtualized application 144 in operation 410, using message 312. In some examples, this occurs by user 104 directing a browser 112 to a website linked to host node 140 and performing some action at the website to trigger host node 140 to begin executing virtualized application 144. Operation 412 includes displaying initial login prompt screen 200 (see FIG. 2) in virtualized application 144. Initial login prompt screen 200 is sent from virtualized application 144 (executing at host node 140) as message 314 to UE 102 for display as application experience 110.

At 414, user 104 selects login control button 204 (e.g., via a tap on a touchscreen of UE 102, where login control button 204 is displayed within application experience 110), and UE 102 sends an indication of a login attempt to host node 140, specifically, to virtualized application 144, as message 316a. Virtualized application 144 forwards the indication of the login attempt by UE 102 to service provider node 150 as message 316b, which then forwards the indication to authentication server 160 as message 316c. In some examples, virtualized application 144 forwards the indication of the login attempt by UE 102 directly to authentication server 160. In some examples, application experience 110 contains sufficient functionality (e.g., as html code provided from virtualized application 144) to provide the indication of the login attempt by UE 102 directly to service provider node 150 or authentication server 160, without needing to involve host node 140. Whichever path is implemented, operation 414 includes receiving an indication of a login attempt by UE 102 using virtualized application 144.

At operation 416, authentication server 160 sends (transmits) an authentication code to UE 102 as message 318, for example using SMS or another messaging service. Operation 416 includes, based on at least receiving the indication of the login attempt by UE 102, transmitting an SMS (or other type) message 318 to UE 102, message 318 indicating an authentication code 164. In some examples, authentication server uses a security function 162 to securely generate authentication code 164 so that hacker 136 is unable to spoof authentication code 164. In some examples, message 318 comprises a silent SMS message. A silent SMS message is one in which the recipient device (e.g., another cellular phone) does not display the message or otherwise alert the user of the recipient device. For additional security, some examples may limit the number of messages 318 that authentication server 160 sends to UE 102 (e.g., only three per any 5-minute time window), to limit risk in the event that UE 102 has been compromised by hacker 136.

UE 102 receives authentication code 164 at 418, and processes authentication code 164 at 420 (represented as 320 in FIG. 3). In some examples, operation 420 comprises merely copying authentication code 164. In some examples, operation 420 comprises performing a one-way function (e.g., a hash function) on authentication code 164. In some examples, operation 420 comprises combining (e.g., concatenating) authentication code 164 and persistent data on UE 102 and performing a one-way function on the combination of authentication code 164 and the persistent data. In some examples, operation 420 is performed by response logic 114 on UE 102. In some examples, the persistent data comprises an international mobile equipment identity (IMEI) number 116.

The result of operation 420 is an indication 166 of UE 102 having received authentication code 164. UE 102 returns indication 166 as a response message 322 to authentication server 160, in operation 422. Operation 424 includes authentication server 160 receiving indication 166 of UE 102 having received authentication code 164. Authentication server 160 is able to perform the first of the two stages: verifying that UE 102 is actually on cellular network 120, for example by verifying the MCC and MNC for UE 102 using message 318. In some examples, indication 166 of UE 102 having received authentication code 164 comprises an indication selected from the list consisting of: a copy of authentication code 164, a result of a one-way function performed on authentication code 164, and a result of a one-way function performed on a combination of authentication code 164 and persistent data (e.g., IMEI number 116) on UE 102. Authentication server 160 (and by extension, service provider node 150) now have the ability to distinguish UE 102 from hacker 136, and use this ability to permit user 104 to move to the next stage of authentication (user credentials).

Decision operation 426 (represented as 324 in FIG. 3) determines whether indication 166 of UE 102 having received authentication code 164 is valid, for example by comparing indication 166 with authentication code 164, reproducing the result of the one way function of operation 420, or some other process. If indication 166 comprises a hash of authentication code 164 and IMEI number 116, authentication server 160 and/or service provider node 150 will be able to independently reproduce indication 166, because authentication server 160 and/or service provider node 150 will have learned IMEI number 116 during the setup process in operation 402, and authentication server 160 generated authentication code 164. If indication 166 is invalid, it is ignored at 440.

If indication 166 is valid, user 104 will be permitted to enter user credentials. Operation 428 includes, based on at least determining that indication 166 of UE 102 having received authentication code 164 is valid, controlling virtualized application 144 to permit entry of user credentials. In some examples, this may involve authentication server 160 or service provider node 150 sending a message 326 to virtualized application 144 to display user credential entry screen 210 or user credential entry screen 220 (see FIG. 2). Virtualized application 144 sends user credential entry screen 210 or user credential entry screen 220 to application experience 110 as message 328. In some examples, the user credentials comprise username 212 and/or password 216. In some examples, the user credentials comprise biometric data. Thus, in some examples, controlling virtualized application 144 to permit entry of user credentials comprises an action selected from the list consisting of: displaying user credential entry screen 210 or 220 in virtualized application 144, and controlling virtualized application 144 to read biometric data (e.g., from camera 224 or fingerprint reader 226).

At 430, user 104 enters the user credentials, which are returned to service provider node 150. In some examples, this is accomplished by UE 102 sending message 330a to host node 140 (e.g., application experience 110 communicating with virtualized application 144) and host node 140 forwarding message 330a to service provider node 150 as message 330b. In some examples, UE 102 communicates directly with service provider node 150. Operation 432 includes receiving, through virtualized application 144, the user credentials. Because of the earlier stage of validating UE 102 via message 318 (e.g., with operations 416-428), operation 432 comprises, based on at least determining that indication 166 of UE 102 having received authentication code 164 is valid, accepting user credentials from virtualized application 144. Decision operation 434 (represented as 332 in FIG. 3) determines whether the user credentials are valid, for example using an identity management 154 that lists authorized users and user accounts. If they are not, the login attempt is ignored at 440.

Operation 436 includes, based on at least determining that the user credentials are valid, granting virtualized application 144 access to controlled resource 152a or 152b. service provider node 150 sends a message 334a to host node 140, which is forwarded to UE 102 as a notification in virtualized application 144, using message 334b. In some examples, controlled resource 152a comprises a secured user account. In some examples, controlled resource 152b comprises a payment portal. In operation 438, user 104 makes a payment or performs other user account activity using message 336, such as updating a user profile in identity management 154, purchasing products or services, responding to promotions, or other activity.

Figure 5:
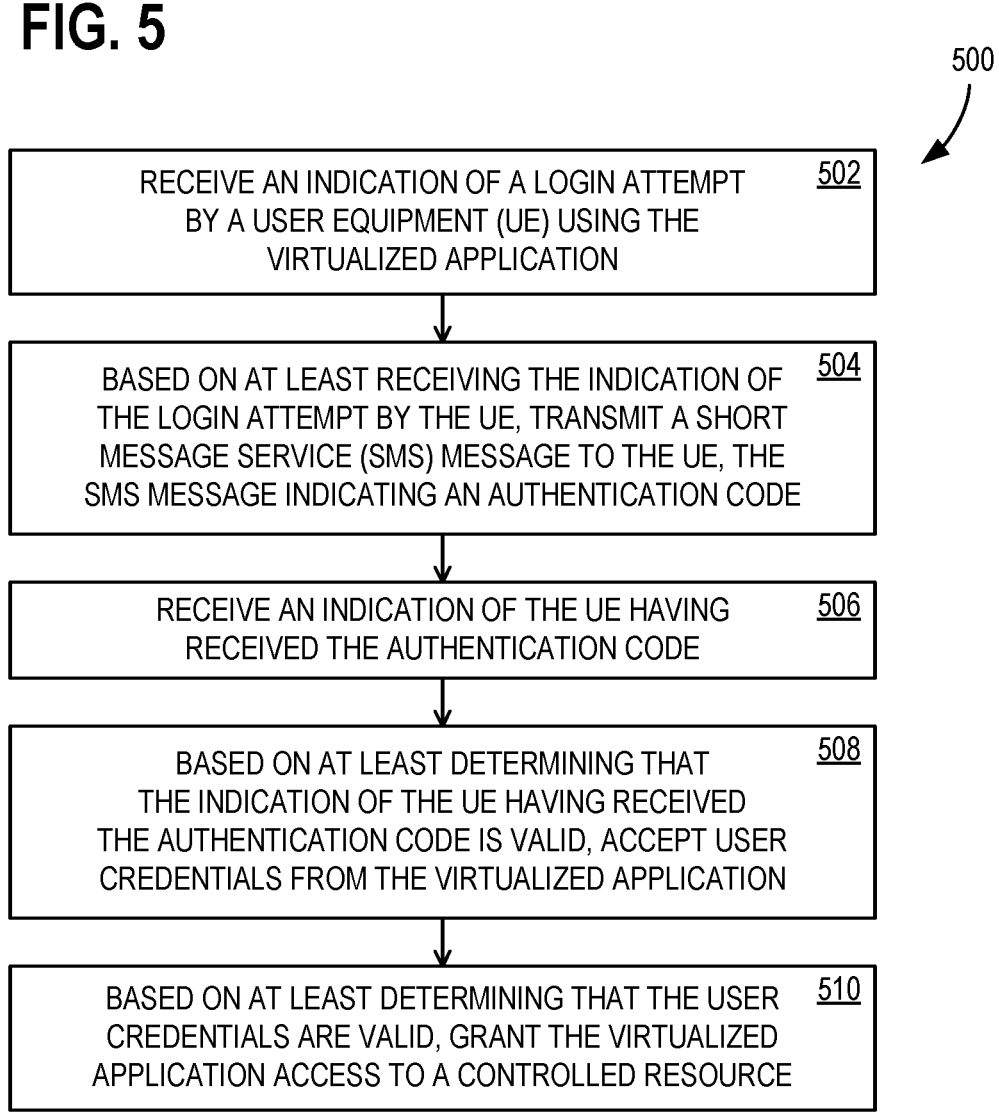
FIG. 5 illustrates another flowchart of exemplary operations that may be associated with examples of the arrangement of FIG. 1.

FIG. 5 illustrates a flowchart 500 of exemplary operations associated with user authentication within a virtualized application. In some examples, at least a portion of flowchart 500 may be performed using one or more computing devices 600 of FIG. 6. Operation 502 includes receiving an indication of a login attempt by a UE using the virtualized application. Operation 504 includes, based on at least receiving the indication of the login attempt by the UE, transmitting an SMS message to the UE, the SMS message indicating an authentication code. Operation 506 includes receiving an indication of the UE having received the authentication code. Operation 508 includes, based on at least determining that the indication of the UE having received the authentication code is valid, accepting user credentials from the virtualized application. Operation 510 includes, based on at least determining that the user credentials are valid, granting the virtualized application access to a controlled resource.

Figure 6:
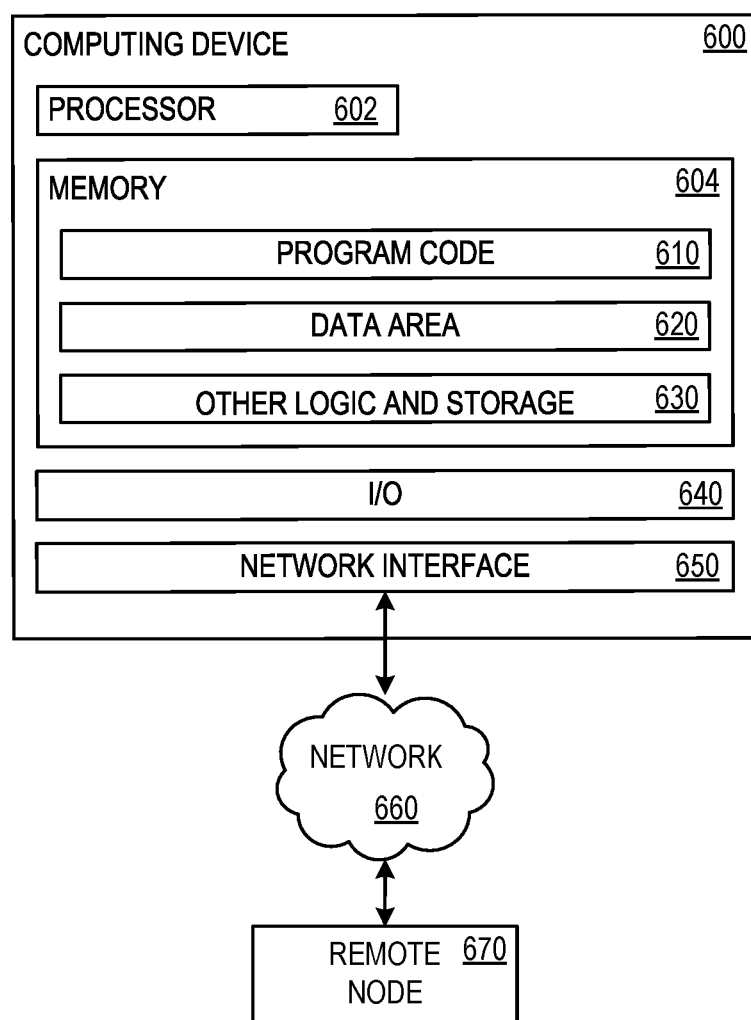
FIG. 6 illustrates a block diagram of a computing device suitable for implementing various aspects of the disclosure.

FIG. 6 illustrates a block diagram of computing device 600 that may be used as a component of arrangement 100, for example, as any component described herein that may require computational or storage capacity. Computing device 600 has at least a processor 602 and a memory 604 that holds program code 610, data area 620, and other logic and storage 630. Memory 604 is any device allowing information, such as computer executable instructions and/or other data, to be stored and retrieved. For example, memory 604 may include one or more random access memory (RAM) modules, flash memory modules, hard disks, solid-state disks, persistent memory devices, and/or optical disks. Program code 610 comprises computer executable instructions and computer executable components including any instructions necessary to perform operations described herein. Data area 620 holds any data necessary to perform operations described herein. Memory 604 also includes other logic and storage 630 that performs or facilitates other functions disclosed herein or otherwise required of computing device 600. An input/output (I/O) component 640 facilitates receiving input from users and other devices and generating displays for users and outputs for other devices. A network interface 650 permits communication over a network 660 with a remote node 670, which may represent another implementation of computing device 600.

ADDITIONAL EXAMPLES

An example method of user authentication within a virtualized application comprises: receiving an indication of a login attempt by a UE using the virtualized application; based on at least receiving the indication of the login attempt by the UE, transmitting an SMS message to the UE, the SMS message indicating an authentication code; receiving an indication of the UE having received the authentication code; based on at least determining that the indication of the UE having received the authentication code is valid, accepting user credentials from the virtualized application; and based on at least determining that the user credentials are valid, granting the virtualized application access to a controlled resource.

An example system for user authentication within a virtualized application comprises: a processor; and a computer-readable medium storing instructions that are operative upon execution by the processor to: receive an indication of a login attempt by a UE using the virtualized application; based on at least receiving the indication of the login attempt by the UE, transmit an SMS message to the UE, the SMS message indicating an authentication code; receive an indication of the UE having received the authentication code; based on at least determining that the indication of the UE having received the authentication code is valid, accept user credentials from the virtualized application; and based on at least determining that the user credentials are valid, grant the virtualized application access to a controlled resource.

One or more example computer storage devices have computer-executable instructions stored thereon, which, upon execution by a computer, cause the computer to perform operations comprising: receiving an indication of a login attempt by a UE using the virtualized application; based on at least receiving the indication of the login attempt by the UE, transmitting a short message service (SMS) message to the UE, the SMS message indicating an authentication code; receiving an indication of the UE having received the authentication code; based on at least determining that the indication of the UE having received the authentication code is valid, accepting user credentials from the virtualized application; and based on at least determining that the user credentials are valid, granting the virtualized application access to a controlled resource.

Alternatively, or in addition to the other examples described herein, examples include any combination of the following:
- the SMS message comprises a silent SMS message;
- the indication of the UE having received the authentication code comprises an indication selected from the list consisting of: a copy of the authentication code, a result of a one-way function performed on the authentication code, and a result of a one-way function performed on a combination of the authentication code and persistent data on the UE;
- accepting user credentials from the virtualized application comprises an action selected from the list consisting of: displaying a user credential entry screen in the virtualized application, and controlling the virtualized application to read biometric data;
- receiving a biometric registration from the UE for use of biometric data for the user credentials, wherein receiving the biometric data comprises an image of a user's face or a user's fingerprint;
- the controlled resource comprises a secured user account;
- the controlled resource comprises a payment portal;
- displaying an initial login prompt screen in the virtualized application;
- the user credentials comprise a username and/or a password;
- the user credentials comprise biometric data;
- the biometric data comprises a fingerprint and/or an image of a user's face; and
- the persistent data on the UE comprises an IMEI number.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:
receiving an indication of a user equipment (UE) attempting to login to a virtualized application executing on a host node that is separate and distinct from the UE, the virtualized application being a lightweight version of a full application adapted for execution on the UE, wherein the full application is configured to persistently store data for authenticating the UE on the UE, and wherein the virtualized application is unable to persistently store the data for authenticating the UE on the UE;

in response to the UE attempting to login to the virtualized application executing on the host node, transmitting a short message service (SMS) message to the UE, the SMS message indicating an authentication code;

receiving an indication of the UE having received the authentication code;

based on at least determining that the indication of the UE having received the authentication code is valid, controlling the virtualized application to accept user credentials; and based on at least determining that the user credentials are valid, granting the virtualized application access to a controlled resource.

2. The method of claim 1, wherein the SMS message comprises a silent SMS message, the UE reaches the host node via Wi-Fi and both the SMS message and the indication of the UE having received the authentication code are transmitted over a cellular air interface.

3. The method of claim 1, wherein the indication of the UE having received the authentication code comprises an indication selected from the list consisting of:
a copy of the authentication code, a result of a one-way function performed on the authentication code, and a result of a one-way function performed on a combination of the authentication code and persistent data on the UE.

4. The method of claim 1, wherein controlling the virtualized application to accept user credentials comprises an action selected from the list consisting of:
displaying a user credential entry screen in the virtualized application, and controlling the virtualized application to read biometric data.

5. The method of claim 1, further comprising:
receiving a biometric registration from the UE for use of biometric data for the user credentials, wherein receiving the biometric data comprises an image of a user's face or a user's fingerprint.

6. The method of claim 1, wherein the controlled resource comprises a secured user account.

7. The method of claim 1, wherein the controlled resource comprises a payment portal.

8. The method of claim 1, wherein the virtualized application forwards the indication of the UE attempting to login to the virtualized application to at least one of a service provider node or an authentication server.

9. The method of claim 1, wherein the full application is not installed on the UE when the UE attempts to login to the virtual application.

10. A system comprising:
a processor; and
a computer-readable medium storing instructions that are operative upon execution by the processor to:
receive an indication of a user equipment (UE) attempting to login to a virtualized application executing on a host node that is separate and distinct from the UE, the virtualized application being a lightweight version of a full application adapted for execution on the UE, wherein the full application is configured to persistently store data for authenticating the UE on the UE, and wherein the virtualized application is unable to persistently store the data for authenticating the UE on the UE;

in response to the UE attempting to login to the virtualized application executing on the host node, transmit a short message service (SMS) message to the UE, the SMS message indicating an authentication code;

receive an indication of the UE having received the authentication code;

based on at least determining that the indication of the UE having received the authentication code is valid, control the virtualized application to accept user credentials; and based on at least determining that the user credentials are valid, grant the virtualized application access to a controlled resource.

11. The system of claim 10, wherein the SMS message comprises a silent SMS message, the UE reaches the host node via Wi-Fi and both the SMS message and the indication of the UE having received the authentication code are transmitted over a cellular air interface.

12. The system of claim 10, wherein the indication of the UE having received the authentication code comprises an indication selected from the list consisting of:

a copy of the authentication code, a result of a one-way function performed on the authentication code, and a result of a one-way function performed on a combination of the authentication code and persistent data on the UE.

13. The system of claim 10, wherein controlling the virtualized application to accept user credentials comprises an action selected from the list consisting of:

displaying a user credential entry screen in the virtualized application, and controlling the virtualized application to read biometric data.

14. The system of claim 10, wherein the operations are further operative to:

receive a biometric registration from the UE for use of biometric data for the user credentials, wherein receiving the biometric data comprises an image of a user's face or a user's fingerprint.

15. The system of claim 10, wherein the controlled resource comprises a secured user account.

16. The system of claim 10, wherein the received indication of the UE having received the authentication code is a response message from the UE, and wherein the response message is used to verify that the UE is on a specific cellular network, including by verifying a mobile country code and mobile network code for the UE.

17. One or more computer storage devices having computer-executable instructions stored thereon, which, upon execution by a computer, cause the computer to perform operations comprising:

receiving an indication of a user equipment (UE) attempting to login to a virtualized application executing on a host node that is separate and distinct from the UE, the virtualized application being a lightweight version of a full application adapted for execution on the UE, wherein the full application is configured to persistently store data for authenticating the UE on the UE, and wherein the virtualized application is unable to persistently store the data for authenticating the UE on the UE;

in response to the UE attempting to login to the virtualized application executing on the host node, transmitting a short message service (SMS) message to the UE, the SMS message indicating an authentication code;

receiving an indication of the UE having received the authentication code;

based on at least determining that the indication of the UE having received the authentication code is valid, controlling the virtualized application to accept user credentials; and based on at least determining that the user credentials are valid, granting the virtualized application access to a controlled resource.

18. The one or more computer storage devices of claim 17, wherein the SMS message comprises a silent SMS message, the UE reaches the host node via Wi-Fi and both the SMS message and the indication of the UE having received the authentication code are transmitted over a cellular air interface.

19. The one or more computer storage devices of claim 17, wherein the indication of the UE having received the authentication code comprises an indication selected from the list consisting of:

a copy of the authentication code, a result of a one-way function performed on the authentication code, and a result of a one-way function performed on a combination of the authentication code and persistent data on the UE.

20. The one or more computer storage devices of claim 17, wherein controlling the virtualized application to accept user credentials comprises an action selected from the list consisting of:

displaying a user credential entry screen in the virtualized application, and controlling the virtualized application to read biometric data.

* * * * *